United States Patent [19]

Castelaz et al.

[11] Patent Number: 5,422,983
[45] Date of Patent: Jun. 6, 1995

[54] NEURAL ENGINE FOR EMULATING A NEURAL NETWORK

[75] Inventors: Patrick F. Castelaz, Yorba Linda; Dwight E. Mills, La Verne; Steven C. Woo, Stanford; Jack I. Jmaev, La Habra; Tammy L. Henrikson, Fullerton, all of Calif.

[73] Assignee: Hughes Aircraft Company, Los Angeles, Calif.

[21] Appl. No.: 93,795

[22] Filed: Jul. 19, 1993

Related U.S. Application Data

[63] Continuation of Ser. No. 936,713, Aug. 31, 1992, abandoned, which is a continuation of Ser. No. 534,211, Jun. 6, 1990, abandoned.

[51] Int. Cl.$^6$ .............................................. G06F 15/18
[52] U.S. Cl. ........................................ 395/24; 395/22; 395/27
[58] Field of Search .................... 395/24, 22, 23, 27

[56] References Cited

U.S. PATENT DOCUMENTS

| | | | |
|---|---|---|---|
| 3,287,649 | 11/1966 | Rosenblatt | 395/24 |
| 4,972,363 | 11/1990 | Nguyen et al. | 364/148 |
| 4,974,146 | 11/1990 | Works et al. | 364/200 |
| 5,052,043 | 9/1991 | Gaborski | 395/23 |

(List continued on next page.)

FOREIGN PATENT DOCUMENTS 2206428 1/1989 United Kingdom.

OTHER PUBLICATIONS

"Design of Parallel Hardware Neural Network Systems From Custom Analog VLSI, 'Building Block' Chips", Silvio Eberhardt, Tuan Duong and Anil Thakoor, vol. 2, IJCNN, Jun. 18–22, 1989.

"Simulation Machine and Integrated Implementation of Neural Networks" L. B. Almeida and C. J. Wellekens (Eds.), C. Jutten and A. Guerin and J. Hrault EURASIP Workshop Feb. 15–17, 1990.

"A digital Neuro-Chip with Unlimited Connectability for large scale Neural Networks", Yuzo Hirai.

"VLSI Architectures for Neural Networks", Philip Treleaven, Marco Pacheco and Marley Vellasco, 1989 IEEE.

"Neurocomputers: Machines for Implementing Neural Networks", Chapter-8—from Neurocomputing by Hecht–Nielsen, Robert, 1990.

"A General Purpose Digital Architecture for Neural Network Simulations", M. Duranton and N. Mauduit, 1st IEE Int. Conf on Artificial Neural Networks, 16–18 Oct., 1989.

(List continued on next page.)

Primary Examiner—Robert W. Downs
Assistant Examiner—George Davis
Attorney, Agent, or Firm—W. K. Denson-Low

[57] ABSTRACT

The neural engine (20) is a hardware implementation of a neural network for use in real-time systems. The neural engine (20) includes a control circuit (26) and one or more multiply/accumulate circuits (28). Each multiply/accumulate circuit (28) includes a parallel/serial arrangement of multiple multiplier/accumulators (84) interconnected with weight storage elements (80) to yield multiple neural weightings and sums in a single clock cycle. A neural processing language is used to program the neural engine (20) through a conventional host personal computer (22). The parallel processing permits very high processing speeds to permit real-time pattern classification capability.

7 Claims, 3 Drawing Sheets

U.S. PATENT DOCUMENTS

| | | | |
|---|---|---|---|
| 5,107,454 | 4/1992 | Niki | 395/24 |
| 5,131,072 | 7/1992 | Yoshizawa et al. | 395/24 |
| 5,136,717 | 8/1992 | Morley et al. | 395/27 |
| 5,155,802 | 10/1992 | Mueller et al. | 395/11 |

OTHER PUBLICATIONS

An Introduction to Computing with Neural Nets. Richard P. Lippmann, IEEE ASSP Magazine, Apr. 1987.

IEEE First International Conference on Neural Networks, San Diego, Calif., US, 21–24 Jun. 1987, IEEE, S. C. J. Garth: "A chipset for high speed simulation of neural network systems", pp. III-443-452, see figures 3,4; p. 446, line 1—p. 449, line 8.

Neuronimes 89, Nimes FR, 13–16 Nov. 1989, C. Jutten et al.: "Emulateurs de reseaux neuronaux", pp. 1–15, see figure 4; p. 8, line 26—p. 12, line 6.

1990 IEEE International Symposium on Circuits and Systems, vol. 4 of 4, New Orleans, La., US, 1–3 May 1990, S. Shams et al.: "Mapping of neural networks onto programmable parallel machines", pp. 2613–2617 see figure 8; p. 2615, right-hand column, line 4—p. 2617, left-hand col., line 33.

IEEE International Conference on Neural Networks, San Diego, Calif., US, 24–27 Jul. 1988, D. A. Pomerleau et al.: "Neural network simulation at Warp Speed: How we got 17 million connections per second", pp. II-14-3-150 see figure 1; p. 144, lines 1–21; p. 148, lines 15–24; p. 149, lines 7–19.

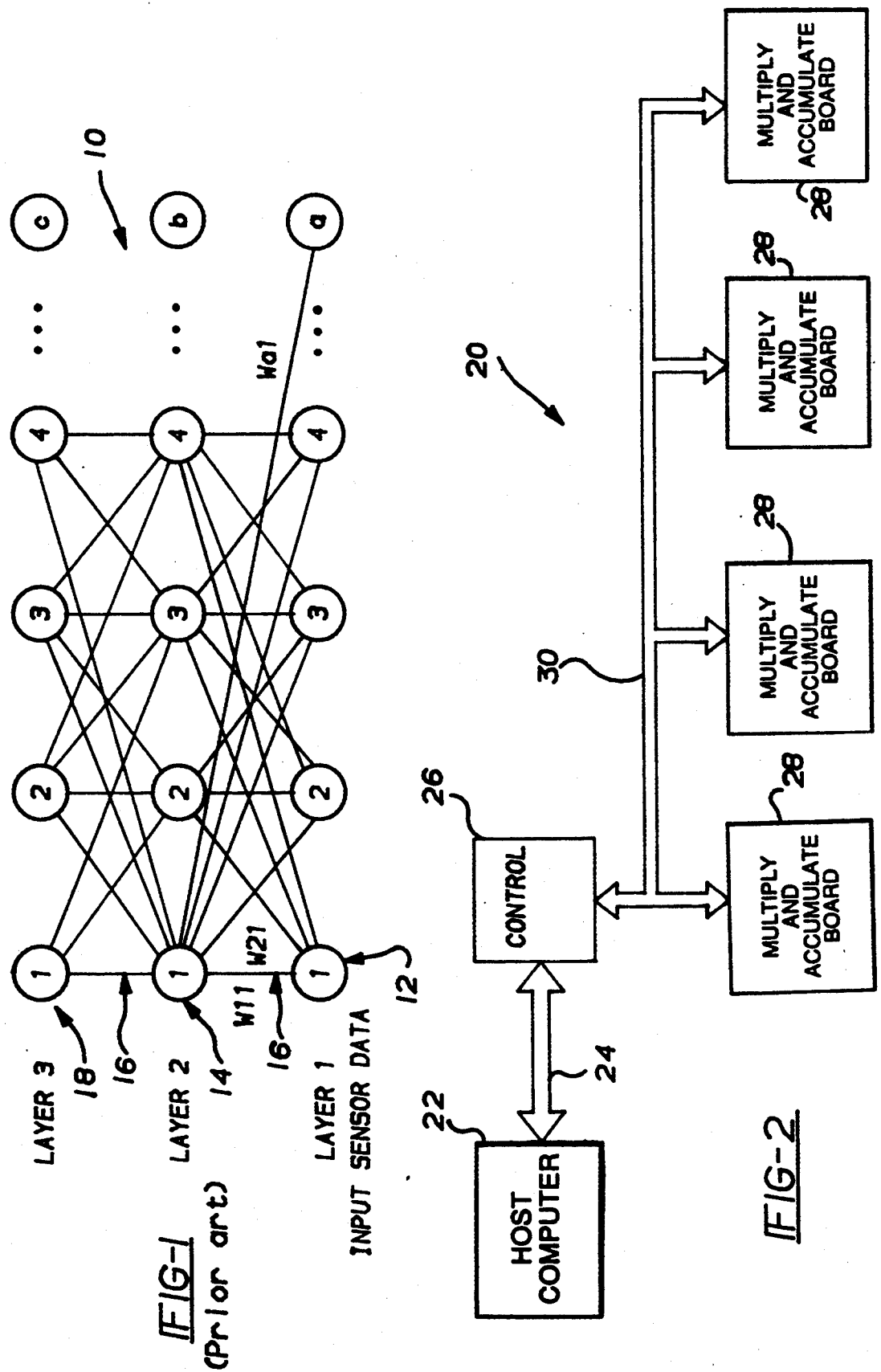

NEURAL ENGINE FOR EMULATING A NEURAL NETWORK

This is a continuation of application Ser. No. 936,713, filed Aug. 31, 1992, now abandoned, which is a continuation of application Ser. No. 07/534,211, filed Jun. 6, 1990, now abandoned.

BACKGROUND OF THE INVENTION

1. Technical Field

This invention relates to neural computing systems and methods and, more particularly, to a reconfigurable system for emulating multiple neural network architectures.

2. Discussion

Biologically inspired artificial neural networks have opened up new possibilities to apply computation to areas that were previously thought to be the exclusive domain of human intelligence. Neural networks learn and remember in ways that resemble human processes. Areas which show the greatest promise for neural networks, such as pattern classification tasks like speech and image recognition, are areas where conventional computers have had the greatest difficulty.

In general, artificial neural networks are systems composed of many nonlinear computational elements operating in parallel and arranged in patterns reminiscent of biological neural nets. The computational elements, or nodes, are connected via variable weights that are typically adapted during use to improve performance. Thus, in solving a problem, neural net models can explore many competing hypothesis simultaneously using massively parallel nets composed of many computational elements connected by links with variable weights. In contrast, with conventional von Neumann computers, an algorithm must first be developed manually, and a program of instructions written and executed sequentially. In some applications, this has proved extremely difficult. This makes conventional computers unsuitable for many real-time problems.

The implementation of neural network systems, however, has lagged somewhat behind their theoretical potential due to the difficulties in building neural network hardware. This is primarily because of the large numbers of neurons and weighted connections required. The emulation of even of the simplest biological nervous systems would require neurons and connections numbering in the millions. Due to the difficulties in building such highly interconnected processors, the currently available neural network hardware systems have not approached this level of complexity. Another disadvantage of hardware systems is that they typically are custom designed and built to implement one particular neural network architecture and are not easily, if at all, reconfigurable to implement different architectures.

To overcome these limitations in current neural network hardware, a number of software simulations of neural networks have been developed. Software systems have the advantage of being easier to reconfigure than hardware systems. However, since software simulations are performed on conventional sequential computers, they do not take advantage of the inherent parallelism of neural network architectures. Consequently, they are relatively slow. One frequently used measurement of the speed of a neural network processor is the number of interconnections it can perform per second. For example, the fastest software simulations available can perform up to about 18 million interconnects per second. Such speeds, however, currently require expensive super computers to achieve. Even so, 18 million interconnects per second is still too slow to perform many classes of pattern classification tasks in real time. These include radar target classifications, sonar target classification, automatic speaker identification, automatic speech recognition and electro-cardiogram analysis, etc.

Thus, it would be desirable to provide a system for emulating a neural network that is relatively easy to reconfigure for the simulation of a variety of neural network architectures. Further, it would be desirable to provide a neural network system which employs the inherent parallelism in neural networks to improve the speed of computation so that pattern classification problems can be performed in real-time.

A further consideration is that neural computation generally involves two steps. The first step is the learning procedure in which interconnection weights are repeatedly adjusted to improve the performance of the system. Once learning is complete, in the second step the neural network operates on a given problem to produce a desired solution. After training, the interconnection weights are known and problems can be solved with a system having fixed weights. By separating the learning procedure from the operating procedure, a fixed weight processor system would be much simpler to construct and faster to operate than a trainable system. Thus, to achieve real-time neural computation, it would be desirable to have a system dedicated to the performance of neural computation on known, fixed weights.

SUMMARY OF THE INVENTION

Pursuant to the present invention, a method and system is provided for emulating a neural network. In accordance with one aspect of the present invention, the neural network processor is hosted in a IBM-AT or AT compatible personal computer for receiving, storing and transmitting a unique set of instructions defining a neural network and its input data. A control circuit is coupled to the host computer for storing and processing the instructions. A multiply and accumulate circuit is also coupled to the control circuit for performing multiply and accumulate functions of the neural network. The multiply and accumulate circuit includes a plurality of weight storage memories for storing a set of interconnection weights and offset values. This circuit also includes multiplier and accumulator devices for generating input times weight products and for summing up all the products for each neuron in the neural network. Each of the multiply and accumulate devices are coupled to one of the weight storage memories so that they can simultaneously perform multiply and accumulate operations during a single clock cycle of the system.

In accordance with another aspect of the present invention, the system includes a neural engine for processing a set of instructions defining a neural network and its input data, and for performing neural network computations. A configuration storage memory is coupled to the neural engine for storing the instructions. Each of the instructions have three fields, including opcode, source register and destination register fields. Some of the instructions are register load and store instructions for transferring neural network parameter data between the configuration memory and the neural engine. Other instructions include neural network instructions for causing the neural engine to process the neural network specified in the configuration storage memory.

In accordance with another aspect of the present invention, a method for emulating a neural network includes the steps of providing a neural engine for performing neural network computations, and providing a configuration storage means coupled to the neural engine for receiving, storing and transmitting a set of instructions defining the architecture and operation of the neural network. Also, the method includes the step of arranging of the instructions so that they have three fields, including opcode, source register and destination register fields, the instructions including register load and storage instructions for initializing and storage of the configuration storage means, and the instructions also including neural network instructions for causing the neural engine to process the neural network specified in the configuration storage means.

BRIEF DESCRIPTION OF THE DRAWINGS

The various advantages of the present invention will become apparent to one skilled in the art, by reading the following specification and by reference to the drawings in which:

FIG. 1 is a diagram of a multi-layer perceptron neural network architecture in accordance with the prior art;

FIG. 2 is a simplified block diagram of the neural engine system in accordance with the present invention;

DESCRIPTION OF THE PREFERRED EMBODIMENT

Figure 3:
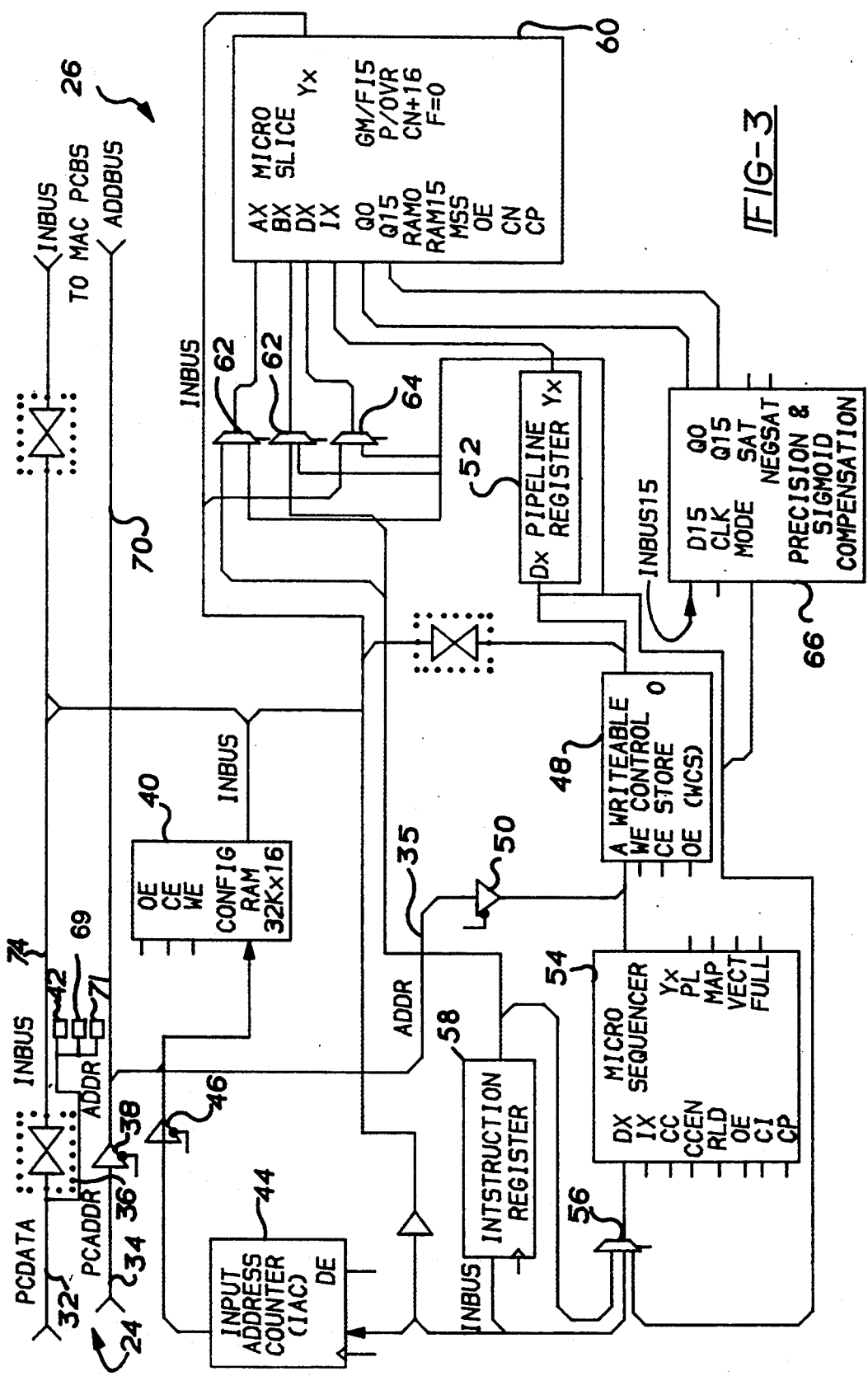
FIG. 3 is a block diagram of the control board portion of the neural engine shown in FIG. 2.

Referring to FIG. 1, there is shown a diagram of a typical neural network architecture known as a multi-layer perceptron 10. This architecture is also known as the back-propagation network due to the back-propagation training algorithm used to train the network. Perceptrons have their origin in the single layer perceptron invented by F. Rosenblatt and disclosed in U.S. Pat. No. 3,287,649, issued in 1966. Since then, many improvements and variations of perceptrons have been developed. Also, entirely different neural net architectures have been created. The multi-layer perceptron 10 shown in FIG. 1, however, is one of the most commonly used architectures today.

In more detail, the perceptron 10 in FIG. 1 includes a first layer of processors, or neurons 12, known as input neurons. The input neurons 12 each receive input data. The set of data in all of the input neurons together comprising an input vector. Each input neuron 12 is connected to each neuron in layer two. These neurons are known as inner neurons 14. Input neurons 14 are connected to the inner neurons by means of weighted connections 16. While input neurons 12 simply receive and transmit the input values, the inner neurons, on the other hand perform a transformation of all of their inputs to produce a given output. In particular, the inputs to a given inner neuron 14 comprise the outputs of all of the input neurons 12 multiplied by a weight value W. Thus, all of the inputs to the first inner neuron 14 may be expressed as $01 = (I1 \times W11) + (I2 \times W21) + (I3 \times W31) + \ldots + (Ia \times Wa1) + (\theta 1)$, where $(\theta 1)$ is an internal offset associated with the neuron 14, Ia is the value of the input to the $a^{th}$ input neuron and $W_{ab}$ is the value of the weight connecting the $a^{th}$ input neuron and the $b^{th}$ inner neuron.

The function performed by the inner neurons 14 is typically a nonlinear transformation such as a Sigmoid function. Thus, the output of each neuron 14 will be defined, for example, by a sigma function as follows: The output of the first inner neuron $= 1/[1 + e^{-01}]$. Each of the b inner neurons 14 are connected by weighted connections 16 to c output neurons 18. The input signal to each output neuron 18 is the sum of the product of the weights on each connection and the output from each inner layer neuron 14.

While the above description is a basic outline of the function of the multi-layer perceptron 10, it will be appreciated that numerous variations on this basic architecture may be employed. Also, the present invention may be adapted to be used with different neural network architectures. A more complete discussion of the multi-layer perceptron as well as other neural network architectures may be found in Richard P. Lippman, "An Introduction To Computing With Neural Nets", IEEE ASSP Magazine, April 1987, page 4, hereby incorporated by reference. Based on the discussion above, it should be noted that a key feature of the computation for a multi-layer perceptron is the multiply and accumulate and sigmoid functions.

The present invention is not concerned with the learning process involved with neural networks. Thus, they need not be discussed here. The above-referenced Lippman article provides a complete discussion of learning procedures used to derive desired weight values for a neural net. Thus, the present invention takes as its starting point a completely defined and trained neural network. The object of the present invention is to process new inputs with the known architecture and weight values in real-time.

Referring now to FIG. 2, there is shown a simplified block diagram of a neural engine system 20 in accordance with the present invention. A host computer 22 may comprise a conventional personal computer such as an IBM AT or other AT compatible computer. It should be noted that while the neural engine system 20 in accordance with the preferred embodiment, utilizes an AT compatible computer 22, the invention may also be employed with other host computers by adapting to the specific interface of the other host. The PC AT host 22 is connected along bus 24 to a control board 26. The bus 24 is a conventional AT I/O bus consisting of an address bus and a data bus. The control board 26 contains the neural engine proper and controls the overall operation of the neural engine system 20.

In accordance with the preferred embodiment, up to four multiply accumulate (MAC) boards 28 are connected to the control board 26 by means of MAC bus 30 which includes a MAC input data bus, a MAC weight address bus, and MAC control signals. The multiply and accumulate boards 28 store weights and theta values and perform the multiply and accumulate functions under the control of the control board 26. In general, the host computer 22 performs the input/output function of the neural engine 20, but control of the neural engine processing is handled by the control board 26.

Referring now to FIG. 3, the control board 26 is shown in more detail. The AT bus, 24 including a data bus 32 and an address bus 34, are shown. The data bus 32 is connected to data bus buffers 36 which consist of a pair of driver/receivers for controlling the inward and outward flow of data along the AT I/O data bus 24. These buffers comprise a pair of HCT 245 type driver/receivers. Likewise, an address bus buffer 38 is connected to the PC address bus 34 and include a pair of HCT 245 driver/receivers and an HCT 573 address latch.

A configuration ram 40 consists of a pair of 32K×8 rams, (to achieve a memory size of 32K×16) such as MT5C2568's. The configuration ram 40 is used to store two's compliment input data at the base layer of the neural network, to store output data from each layer of the neural network, to store a Sigmoid look-up table, and to store neural engine instructions. The neural engine instructions consist of a instruction set called a neural program. This instruction set allows the user to define the configuration of the neural network, to command the neural engine to process input data, and define what termination procedures to follow.

A control register 42 is connected along the AT data bus 32 and is used to control the access of internal and AT I/O buses. It selects a set of ram stacks as the 32KB bank of extended memory, and resets the neural engine system 20. In particular, the AT interface control logic 42 memory access qualification is performed by an HCT 688, I/O access qualification is performed by an HCT 688, and I/O chip selects are controlled by an HCT 138 within the control register 42.

An input address counter 44 generates configuration RAM 40 addresses and consists of four IDTFCT 163A chips. An input address buffer 46 is used to interface the input address counter 44 with the configuration ram 40. The input address buffer 46 comprises a pair of HCT 245 chips.

A writable control store 48 consists of ten IDT611-6LA RAMs connected to the address line 35 through a pair of HCT 245 buffers 50. The writable control store ram 48 contains the neural engine microcode. The basic function of the microcode is to move the data through the neural engine and to control timing. The writable control store 48 does this by activating logic that allows data to be read from the configuration ram 40 and then transmits that data to the multiply accumulate boards 28. RAM as opposed to ROM is used to hold the microcode so that the microcode can be downloaded from the host computer 22 and to permit changes in the microcode when necessary.

A series of pipeline registers 52 are connected to the writable control store RAMs 48 and comprise an HCT 574 connected to each of the IDT6116LA RAMs. The pipeline registers 52 are used to latch the outputs of the microcode to control the timing. A micro program sequencer 54 generates addresses to the microcode, and consists of an IDT 39C10. A micro sequencer data multiplexer 56 is attached to the micro sequencer 54 inputs to select between one of the three sets of inputs to the micro sequencer 54 under control of the pipeline registers 52. The micro sequencer data multiplexer 56 consists of six HCT 153s. An instruction register 58 is used to process some of the initial neural instructions. It consists of a pair of HCT 377s.

A microprocesser slice 60 holds the various neural network architecture parameters and intermediate values that are used during computation. These network parameters are transferred from the configuration RAM 40 to the microslice 60 via a neural instruction in the neural program stored in the configuration ram 40. Two address multiplexers 62 control the address inputs to the microslice 60. The address multiplexers 62 comprise two HCT 157s each. A microslice data multiplexer 64 is also connected to the microslice 60 to control the data inputs. It consists of a set of four HCT 157s.

A precision and Sigmoid compensation circuit 66 is used to generate more precise output values. This is required because with an excess of integer bits information is lost. Sigmoid compensation likewise involves shifting values to make sure that output values in the Sigmoid table in the configuration ram 40 are looked up properly.

The AT data bus 32 contains an auxiliary register 69 comprised of an HCT 574 that selects between one of four weight RAMs (discussed below) and one of the four MAC boards 28. Also on line 32 is a status register 71 which indicates the number of MAC boards 28 and the completion of neuro instruction processing. The status register 71 includes an HCT 245.

Figure 4:
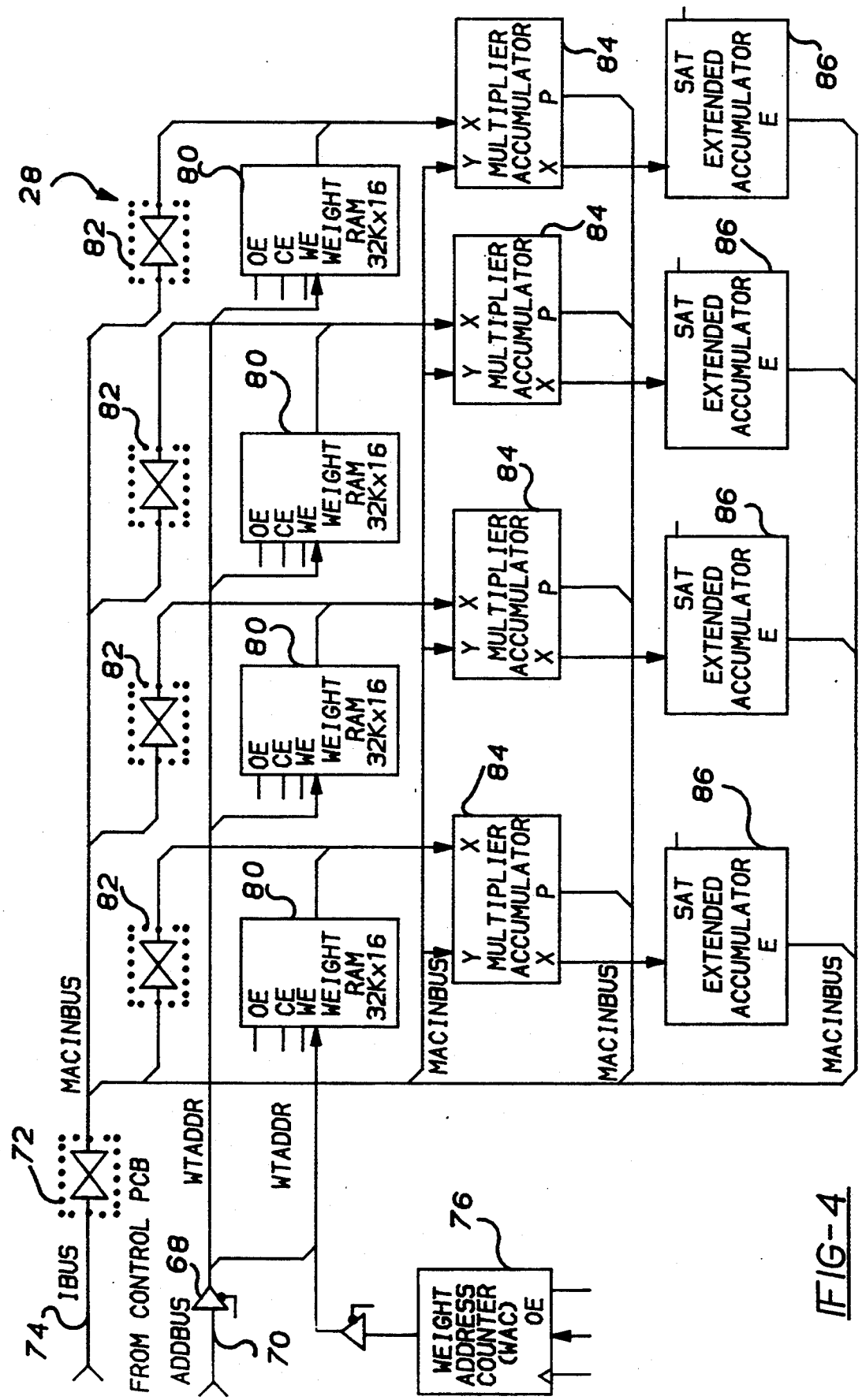
FIG. 4 is a block diagram of one of the multiply and accumulate boards of the neural engine shown in FIG. 2.

Referring now to FIG. 4, a multiply and accumulate board 28 is shown. An address receive buffer 68 is connected to the MAC address bus line 70 from the control board 26. The address receive buffer consists of a pair of HCT 245s. An input buffer 72 is placed on the MAC input bus line 74 from the control board 26. A weight address counter 76 is used to increment weight RAM addresses. It consists of four IDTFCT163As which are attached to a weight address buffer 78 consisting of a pair of HCT 245s.

Four weight rams 80 are attached to the input bus 74 through weight buffers 82. Each weight ram 80 consists of a pair of MT5C2568s and each weight buffer 82 consists of a pair of HCT 245s. The weight rams 80 contain the neural network interconnect weights as well as the theta offset values. Four multiply/accumulators 84 are also attached to the input bus 74 through the weight buffers 82 and are also connected to one of the weight rams 80. The multiply/accumulators 84 consist of an IDT7210L and are used to generate input-weight products and to sum up the input-weight products in accordance with the above described neural network equations.

An extended accumulator 86 is attached to the output of each multiply/accumulator 84. The extended accumulators 86 check for neuron saturation at completion of the multiply/accumulate process. Saturation is basically the turning on point. That is, when all of the inputs reach a certain level the neuron output will be driven to its maximum value according to the Sigmoid function. Additional inputs beyond saturation will not increase the neuron's output. Also, the extended accumulators 86 have 13 extra accumulator bits that are used to insure that no over or under flows occur. That is, if during the processing by the multiply/accumulator 84, while adding and subtracting, there are not enough bits to hold the values, these bits will represent overflow or underflow and would cause all of the information to be lost and the output to be invalid. Thus the extra extended accumulator bits insure that the output value will always be valid. It should be noted that in accordance with the present invention, all four multiply/accumulators 84 operate during a given clock cycle simultaneously on a given multiply accumulate board 28. Further, it should be noted that if all four multiply accumulate boards 28 are functioning there will be 16 multiply accumulate functions performed during each clock cycle.

The interface to the host computer operates as follows. Three sets of switches (not shown) are used to configure the host interface. A set of PCB configuration switches are used to set the configuration for one to four multiply accumulate boards 28. A set of memory configuration switches are used to set a base address value for memory accesses for a 32 KB bank of extended memory. Also, I/O configuration switches are used to set a base address value for I/O accesses. Data which is downloaded from the host computer 22 include inputs, outputs, the Sigmoid look-up table and the neural program, all which are stored in the configuration RAM. Interconnect weights and theta values are downloaded into the weight RAMs 80 and the microcode is downloaded into the writable control store RAM 48.

In operation, the neural engine system 20 functions overall as follows. The host computer 22 first reads the status register 71 to determine the number of MAC boards 28. Next, it turns on reset and PC enable in the control register 42. Next, it downloads microcode, weights, Sigmoid table, neural program, and inputs. Finally, the host disables the AT access to the neural engine RAM by writing to control register 42 with reset and PC enable off, and run enable on.

The neural engine 20 then processes the input data and stores generated outputs in the configuration RAM 40. The neural engine system 20 then interrupts the host 22. The host 22 then will write to the control register 42 with the PC enable on and read outputs from the neural engine configuration RAM. The host 22 may then download the next set of input data and write to the control register 42 with PC enable off.

The neural engine system 20 in accordance with the present invention, utilizes memory mapped I/O with user settable base addresses. This allows the host computer 22 to download weights and inputs and to receive outputs from the neural engine 20 using the memory part of the I/O bus as opposed to the I/O part of the I/O bus. That is, there are basically two ways to access data over the AT bus; the I/O method, which is slow, or the memory method which is quicker. The memory method is referred to as memory mapping because the memory is seen from the host computer's point of view as a block of memory that it can access and it is not concerned with actual physical location of the memory. The neural engine system 20 occupies a 32 kilobyte region of the host memory address space. The neural engine occupies 2 bytes of the host I/O address space. The base address for I/O access to the neural engine 20 is determined by the eight I/O configuration switches which correspond to I/O address bits two through nine of the AT I/O address bus. Bits one and zero of the neural engine 20 address come directly from the AT I/O address bus and are used by application programs to write to the control or auxiliary registers or to read from the status register.

The base address for memory accesses to the neural engine 20 is determined by eight switches which correspond to the ATSA16 and ATLA17-23 bits of the AT memory address space. The ATSA0-16 bits of the AT I/O address define the usable 32K byte region of one of the neural engine 20's RAM stacks.

The RAM stacks, configuration stack 40, Writable Control Store (WCS) stack 48, and weight stacks 80 are accessible as overlapping 32 kilobyte banks of memory with selection of the active bank accomplished through the neural engine 20 control register 42 and auxiliary register 69. The base address of the selected memory in the AT's memory map is selected via switch settings on the control board 26.

The control register 42 occupies a single byte of the AT I/O address space. The control register 42 may be accessed by the AT via an I/O write to the base address specified by the I/O switches with I/O address bits 1 and 0 set to zero.

Bits 2 through 0 of the control register 42, MBS2-0, shall be decoded by the neural engine 20 to determine which type of RAM stack shall be selected for use as the 32 KB AT memory space. They select between the weight RAM stacks 80, the configuration RAM stack 40, and the Writable Control Store (WCS) 48. If the weight RAM stacks are selected, the host 22 must also write to the auxiliary register to specify which MAC PCB and which one of the four weight RAM stacks shall be selected. If the WCS RAM stack is selected with these three bits, the host 22 must also write to the auxiliary register to specify which 16 bits of the 80 bit microcode word is to be downloaded.

Bit 3, PCEN, is used as a qualification bit for memory access to the neural engine 20 from the host computer (IBM PC/AT). Bit 3 is an arbitration bit for the internal busses of the neural engine 20 PCB. When bit 3 is high, the neural engine 20 busses are under direction of the AT's I/O channel. When bit 3 of the control register is low, the internal busses of the neural engine 20 are inaccessible to the host computer.

Bit 4 of the control register 42, RUN_NE, is an active high RUN enable to the neuroengine. When bit 4 of the control register is reset, all clocks to the neuroengine are disabled thereby reducing power consumption. When bit 4 is set, the neuroengine is supplied with a 16 MHz square wave clock and the neuroengine shall continue execution of the current neuro instruction in process. It should be noted that the actual speed of the clock can be changed by using oscillators of different frequencies.

Bit 5 of the control register 42, RST_NE, is an active high hardware reset command. When the reset bit is set, the neural engine 20 is forced into a continuous reset condition. When the reset command is deasserted, the neuroengine shall begin execution of the neuro instruction stored at location 0 in the configuration stack upon deactivation of the PCEN bit.

Bit 6 of the control register, INTEN, is an active high interrupt enable flag. When bit 6 is active, the neural engine 20 is allowed to interrupt the host processor 22 through the Interrupt Host neuro instruction.

The neural engine 20 auxiliary register 69 occupies a single byte of the AT I/O address space. The auxiliary register 69 may be accessed by the AT via an I/O write to the base address specified by the switches on the neural engine 20 with I/O address bit 1 set to zero and I/O address bit 0 set to a one. The auxiliary register 69 has the following organization.

When the msb bits of the control register 42 indicate writing to the weight RAMstacks, bits 0 through 2 of the auxiliary register 69, WTSEL1-0, shall be decoded by the neural engine 20 to determine which one of the four weight RAM stacks of a MAC PCB shall be selected.

Bits 3 through 4, BDSEL1-0, shall be decoded by the neural engine 20 to determine which one of a possible four MAC boards 28 shall be selected.

When the msb bits of the control register 42 indicate writing to the Writable Control Store (WCS), the WTSEL0, BDSEL1, and BDSEL0 bits are decoded to determine to which of the 16 bits of the 80 bit microcode word is being written. Table I describes this decode logic.

TABLE I

Writable Control Store Decode Logic

| BDSEL1 | BDSEL0 | WTSEL0 | WCSWORD |
|---|---|---|---|
| 0 | 0 | 0 | 0 = Bits 0–15 |
| 0 | 0 | 1 | 1 = Bits 16–31 |
| 0 | 1 | 0 | 2 = Bits 32–47 |
| 0 | 1 | 1 | 3 = Bits 48–63 |
| 1 | 0 | 0 | 4 = Bits 64–79 |
| 1 | 0 | 1 | 5 Unused |

The neural engine 20 status register 71 occupies a single byte of the AT I/O address space. The status register 71 may be accessed by the AT via an I/O read to the base address specified by the switches on the neural engine 20 PCB with I/O address bits 1 and 0 set to zero. The status register 71 has the following organization.

Bit 0 of the status register 71, RUN_NE, indicates to the host 22 if the neural engine is running. The neural engine 20 shall halt the processing of neuro instructions upon execution of the STOP Neuro Instruction or if the neural engine 20 tries to interrupt the host without the INTEN bit active.

Bits 1 through 2, BDID1-0, indicate the configuration of the two switch settings on the control board 26 which tells the host 22 the number of MAC PCBs in the neural engine 20 configuration.

Bit 3 of the status register 71, INTEN, is an active high interrupt enable flag, which allows the neural engine 20 to interrupt the host 22.

Bit 4, HINT, indicates if the neural engine 20 tried to interrupt the host. If HINT is set but INTEN is not set, the neural engine 20 will not be able to interrupt the host and will stop processing Neuro instructions. If this occurs and a STOP Neuro instruction is immediately after the Interrupt Host Neuro instruction, the host will need to change the Neuro Program in the neural engine 20 configuration RAM stack before attempting to process more neural network data.

The microprocessor slice 60 provides 64 working registers that are used in the specification of a neural network, These registers can be loaded and can be examined by the execution of register oriented neuro instructions. Table II summarizes the use of these registers.

TABLE II

Neural Engine Working Registers

| REGISTER | | FUNCTION |
|---|---|---|
| 3F | 63 | Neuroprogram Counter (NPC) |
| 3E | 62 | Neuro stack pointer (NSP) |
| 3D | 61 | Output pointer working register |
| 3C | 60 | Number of nodes working register |
| 3B | 59 | Current layer working register |
| 3A | 58 | Register access pointer |
| 39 | 57 | Immediate address working register |
| 38 | 56 | General purpose |
| 37 | 55 | General purpose |
| 36 | 54 | General purpose |
| 35 | 53 | General purpose |
| 34 | 52 | General purpose |
| 33 | 51 | General purpose |
| 32 | 50 | General purpose |
| 31 | 49 | General purpose |
| 30 | 48 | General purpose |
| 2F | 47 | General purpose |
| 2E | 46 | General purpose |
| 2D | 45 | General purpose |
| 2C | 44 | General purpose |
| 2B | 43 | Set to Zero |
| 2A | 42 | CNN Register |
| 29 | 41 | Negative Saturation Value |
| 28 | 40 | Postive Saturation Value |
| 27 | 39 | PCB Configuration-Number of MAC PCB's |
| 26 | 38 | General purpose |
| 25 | 37 | Working Sigmoid Avoid Register |
| 24 | 36 | Precision Compensation Factor |
| 23 | 35 | General purpose |
| 22 | 34 | Sigmoid access compensation |
| 21 | 33 | Pointer to sigmoid table |
| 20 | 32 | Number of neurons in layer 16/Sigmoid avoid |
| 1F | 31 | Number of neurons in layer 15/Sigmoid avoid |
| 1E | 30 | Number of neurons in layer 14/Sigmoid avoid |
| 1D | 29 | Number of neurons in layer 13/Sigmoid avoid |
| 1C | 28 | Number of neurons in layer 12/Sigmoid avoid |
| 1B | 27 | Number of neurons in layer 11/Sigmoid avoid |
| 1A | 26 | Number of neurons in layer 10/Sigmoid avoid |
| 19 | 25 | Number of neurons in layer 9/Sigmoid avoid |
| 18 | 24 | Number of neurons in layer 8/Sigmoid avoid |
| 17 | 23 | Number of neurons in layer 7/Sigmoid avoid |
| 16 | 22 | Number of neurons in layer 6/Sigmoid avoid |
| 15 | 21 | Number of neurons in layer 5/Sigmoid avoid |
| 14 | 20 | Number of neurons in layer 4/Sigmoid avoid |
| 13 | 19 | Number of neurons in layer 3/Sigmoid avoid |
| 12 | 18 | Number of neurons in layer 2/Sigmoid avoid |
| 11 | 17 | Number of neurons in layer 1 |
| 10 | 16 | Pointer to input array for layer 16 |
| 0F | 15 | Pointer to input array for layer 15 |
| 0E | 14 | Pointer to input array for layer 14 |
| 0D | 13 | Pointer to input array for layer 13 |
| 0C | 12 | Pointer to input array for layer 12 |
| 0B | 11 | Pointer to input array for layer 11 |
| 0A | 10 | Pointer to input array for layer 10 |
| 09 | 09 | Pointer to input array for layer 9 |
| 08 | 08 | Pointer to input array for layer 8 |
| 07 | 07 | Pointer to input array for layer 7 |
| 06 | 06 | Pointer to input array for layer 6 |
| 05 | 05 | Pointer to input array for layer 5 |
| 04 | 04 | Pointer to input array for layer 4 |
| 03 | 03 | Pointer to input array for layer 3 |
| 02 | 02 | Pointer to input array for layer 2 |
| 01 | 01 | Pointer to input array for layer 1 |
| 00 | 00 | Number of layers in neural network |

Prior to execution of the process neural network (PNN) instruction, the working registers must be initialized to describe the structure of the neural network (See FIG. 1). The neural engine 20 is able to process networks of up to 16 layers. The registers of Table II are described below.

Register (ROO) must be initialized so that its contents define the number of layers in the neural network.

Registers 1 through 16 must be initialized with the pointers (the addresses) of the input data arrays for each layer of the network.

Registers 17 though 32 must contain the number of neurons in layers 1 through 16. Bit 15 of registers 18 through 32 must be initialized to one if the outputs of that layer are to be stored directly without going through the Sigmoid logic. Bit 15 of registers 18 through 32 will normally be set to a one ("1") indicating the use of the Sigmoid logic. A zero ("0") indicates bypass the Sigmoid logic.

Register 33 shall be initialized with the base address of the Sigmoid table in the Configuration RAM.

Register 34 contains the Sigmoid compensation factor which is equal to 16-n where $2^n$ is the depth of the Sigmoid table. The Sigmoid compensation factor is used by the neural engine and the Precision and Sigmoid compensation device 66 to shift the output value to the right such that it is contained in the least significant bits of the 16 bit Q register of the microprocessor slice 60.

Table III lists the allowable sizes of the Sigmoid table and the corresponding value for the Sigmoid compensation factor to be stored in register 34.

TABLE III

| Sigmoid Compensation Factors | |
|---|---|
| Size of Sigmoid Table | No. of shifts right |
| 1K | 6 |
| 2K | 5 |
| 4K | 4 |
| 8K | 3 |

Register 36 contains the precision compensation factor which indicates a number of times to shift the MSP output of the multiplier accumulator to the left. This shifting is performed by the microprocessor slice 60 and the Precision and Sigmoid compensation device 66. This logic adjusts the neuron output value such that it has only three integer bits. The Compensation Device 66 simultaneously checks for saturation in the output value while it is performing the shifting function. The number of times to shift the neuron output value left is determined by the number of integer bits contained in the MAC output value.

The precision compensation factors are listed below in Table IV.

TABLE IV

| Precision Compensation Factors | |
|---|---|
| No. of MAC output integer bits | No. of shifts left |
| 9 | 5 |
| 8 | 4 |
| 7 | 3 |
| 6 | 2 |
| 5 | 1 |
| 4 | 0 |
| 3 | 0 |
| 2 | 0 |

Register 37 is a working register used by the microcode when checking for the Sigmoid avoid bit.

Register 39 contains the number of MAC boards 28 being used by the neural engine 20.

Register 40 contains the positive saturation value.

Register 41 contains the negative saturation value.

Register 42 is used when processing the CNN Neuro Instruction. The CNN Neuro Instruction sets bit 15 of this register then uses most of the PNN Neuro Instruction microcode. The PNN microcode checks to see if this register is zero when it is finished processing one layer of the network. If this register is not zero, the PNN microcode does not process any more layers of the network. It is illegal to perform a CNN Neuro Instruction and later perform a PNN Neuro Instruction without first resetting this register to zero.

Register 43 contains the value zero ("0").

Registers 35, 38, and 44 through 56 are not used by the microcode and should be set to zero.

Register 57 is used to store and manipulate the immediate address value of the neuro instructions.

Register 58 is used by the microcode to do register indirect accesses to the microprocessor slice 60 using the Instruction Register 58. The least significant 6 bits of Register 58 go to the B address lines of the microprocessor slice 60 and represent the destination address. Bits 6 through 11 of Register 58 go to the A address lines of the microprocessor slice and represent the source address.

Register 59 is a working register used by the microcode to count down the number of layers as it processes a network.

Register 60 is a working register which contains the address of the Configuration RAM 40 in which to store the next output of the network.

Register 61 is a working register used to count down the number of neurons in each output layer after they are stored.

Register 62, the Neuro stack pointer is used to track data stored in the Configuration RAM 40 with the Push and Pop Neuro Instructions.

Register 63 is the Neuroprogram Counter (NPC) used to step through the neuro instructions. The microcode initializes the NPC after the neural engine 20 has been reset.

NOTE: All address values specified in the contents of these registers must be absolute addresses of the data structure as it resides in the configuration RAM stack.

The neural engine executes a set of instructions that allow the specification and processing of neural networks. The neuro instruction set is comprised of word (16 bits) instructions where each instruction is segregated into three fields, the opcode, the source register, and the destination register. Instructions may be followed by an optional instruction word or immediate data.

| BIT15 BIT12 | BIT11 BIT6 | BIT5 BIT0 |
|---|---|---|
| OPCODE | SOURCE REG | DESTINATION REG |

Register load and store instructions. Register load and store instructions are used for the initialization of microprocessor slice registers and the storage of register contents in the configuration RAM stack.

Load register block. The load register block instruction, instruction 0, causes the block of 63 registers pointed to by immediate address to be loaded into the microprocessor slice beginning with register 0 and ending with register 62. The Neuro Program Counter, R63, is not loaded or initialized with the neuro instruction.

MNEMONIC:   LD Rn,#DATA

| BIT15 BIT12 | BIT11 BIT6 | BIT5 BIT0 |
|---|---|---|
| 0000 | XXXXXX | XXXXXX |
| IMMEDIATE ADDRESS | | |

Load register immediate. The load register immediate instruction, instruction 1, causes the register specified by the destination register to be loaded with the immediate data found immediately following the instruction word.

MNEMONIC:   LD Rn,#DATA

| BIT15 BIT12 | BIT11 BIT6 | BIT5 BIT0 |
|---|---|---|
| 0001 | XXXXXX | DESTINATION REG |
| IMMEDIATE DATA | | |

Load register. The load register instruction, instruction 2, causes the contents of memory in the configuration stack addressed by the register specified in the source register field to be loaded into the register specified in the destination field of the instruction.

MNEMONIC: LD Rn,(Rn)

| BIT15 BIT12 | BIT11 BIT6 | BIT5 BIT0 |
|---|---|---|
| 0002 | SOURCE REG | DESTINATION REG |

Store Register. Store register, instruction 3, causes the contents of the register specified in the source field of the instruction to be stored in the configuration RAM stack at the location addressed by the register specified in the destination field of the instruction.

MNEMONIC: ST (Rn),Rn

| BIT15 BIT12 | BIT11 BIT6 | BIT5 BIT0 |
|---|---|---|
| 0011 | SOURCE REG | DESTINATION REG |

Push Register. The push register instruction, instruction 4, causes the neuro stack pointer to be decremented by 1 and the contents of the register specified in the source field of the instruction to be stored in the configuration RAM stack at the address specified in the newly updated neuro stack pointer.

MNEMONIC: PUSH Rn

| BIT15 BIT12 | BIT11 BIT6 | BIT5 BIT0 |
|---|---|---|
| 0100 | SOURCE REG | XXXXXX |

Pop register. The pop register instruction, instruction 5 causes the contents of the configuration RAM stack addressed by the neuro stack pointer (NSP) to be loaded into the register specified in the destination field of the instruction, when the load is accomplished, the value of the NSP is incremented by 1.

MNEMONIC: POP Rn

| BIT15 BIT12 | BIT11 BIT6 | BIT5 BIT0 |
|---|---|---|
| 0101 | XXXXXX | DESTINATION REG |

Neural network instructions. Neural network instructions cause the neuroengine to process the neural network specified in the working registers, configuration RAM stack and the weight RAM stacks.

Process neural network. The process neural network instruction, instruction 6, causes the complete and undisturbed processing of the neural network problem currently specified.

MNEMONIC: PNN

| BIT15 BIT12 | BIT11 BIT6 | BIT5 BIT0 |
|---|---|---|
| 0110 | XXXXXX | XXXXXX |

Continue neural network. The continue neural network instruction, instruction 7, causes the neuroengine to process the next sequential layer. The number of the currently processed layer(s) is pushed onto the stack. Once the layer is processed, the neuroengine fetches another instruction from the configuration RAM stack.

MNEMONIC: CNN

| BIT15 BIT12 | BIT11 BIT6 | BIT5 BIT0 |
|---|---|---|
| 0111 | XXXXXX | XXXXXX |

Miscellaneous instructions. The miscellaneous instructions facilitate processing once the neural network instructions have been processed.

Interrupt host. The interrupt host instruction, instruction 8, causes the neural engine 20 to interrupt the host computer 22 provided that the interrupt enable flag in the control register is set.

MNEMONIC: INTHST

| BIT15 BIT12 | BIT11 BIT6 | BIT5 BIT0 |
|---|---|---|
| 1000 | XXXXXX | XXXXXX |

Stop. The stop instruction, instruction 9, causes the neural engine to reset the RUN enable bit in the control register. This effectively stops execution of the neuro instruction stream. The value of all registers including the NPC and NSP are preserved. Execution of neuro instructions can be reinitiated by the host processor by setting the RUN enable bit in the control register. When the RUN enable bit is set, execution of neuro instruction(s) continues with the instruction immediately following the stop instruction.

MNEMONIC: STOP

| BIT15 BIT12 | BIT11 BIT6 | BIT5 BIT0 |
|---|---|---|
| 1001 | XXXXXX | XXXXXX |

Jump immediate address. The jump immediate address instruction, instruction 10, causes the neural engine 20 to begin execution of neuro instructions at the address specified in the immediate address field.

MNEMONIC: JMP#ADDRESS

| BIT15 BIT12 | BIT11 BIT6 | BIT5 BIT0 |
|---|---|---|
| 1010 | XXXXXX | XXXXXX |
| IMMEDIATE ADDRESS | | |

The overall neuro instruction sequence is as follows:

(1) load program counter into input address counter;
(2) read neuro instruction from configuration ram and load into instruction register;
(3) use opcode of neuro instruction to jump to instruction sub-routine;
(4) microcode executes neuro instruction;
(5) microcode increments program counter to point to next neuro instruction; and
(6) repeat process.

For example, a sample neural program may be as follows:

| Program Counter | |
|---|---|
| 0-1 | load register block |
| 2 | process neural network |
| 3 | interrupt post |
| 4 | stop |
| 5-6 | jump immediate address = to) |

An overview of the Process Neural Network instruction is as follows:

(1) decrement number of layers in working register and check to see if there are more layers to process;
(2) load number of nodes in output layer into working register;
(3) load pointer for storing output neurons for this layer into working register;

(4) load pointer to first neuron on input layer into input address counter; and (5) proceed to multiply accumulate processing.

The multiply accumulate process proceeds as follows:

Preloop:
(1) read first input and weight values;
(2) clock MAC inputs-multiply only, read second input and weight values;
(3) clock MAC inputs-multiply accumulate, clock MAC product register, read third input and weight values.

Loop:
(1) clock MAC inputs-multiply accumulate, clock MAC product register, clock extended accumulator, read next input and weight values.

Postloop:
(1) clock extended accumulator.

The output processing procedure is as follows:
(1) check for saturation in extended accumulator 56;
(2) if saturation occurred, store saturation value as the output for the node in the configuration RAM, skip steps 3-6 and begin processing next output neuron;
(3) if saturation did not occur, retrieve the MSP value from product register of the MAC 84 and store temporarily in microslice 60;
(4) perform precision compensation and Sigmoid compensation if necessary on the MAC product;
(5) add this value to the base address of the Sigmoid table in the configuration RAM40 and use this as the address into the Sigmoid look-up table;
(6) read the output from the Sigmoid table, store in microslice 60 while loading the output pointer into the IAC, store output in configuration RAM 40.

It should be recognized that the neural engine system 20 in accordance with the present invention, provides the network operation only and that the training function must be performed beforehand. Also, it will be appreciated that the downloadable microcode allows for ease in making changes to the control logic. Likewise, the neuro programming language in accordance with the present invention, allows for flexibility in data processing. The use of CMOS surface mount technology is incorporated to give fast speeds, lower power and more dense boards. For example, the control board power consumption is typically about 11 watts and each MAC board 28 power consumption is approximately 9 watts. Note that the clock to the neural engine system 20 is turned off during PC host accesses, substantially decreasing the power consumption during this period.

A key advantage of the neural engine system 20 is its speed. For example, with the neural engine employing a single multiply accumulate board and one control board 26 operating at 15 MHz, the system can process 256 neurons per layer in a three layer network, utilizing 128,000 interconnect weights to perform 60 million interconnects per second. With four MAC boards 28, the system can process 512 neurons per layers, 512,000 interconnect weights, and can perform 240 million interconnects per second. A fully configured neural engine system 20 will be able to process a 512 pixel image using a $512 \times 512 \times 512$ network in less than 10 microseconds.

It will be appreciated that the processing performance is substantially better than software simulations and currently available hardware. This makes the neural engine 20 usable in real time systems. Also, the multiplier accumulators 84 and extended accumulators 86 operate in such a way that true neuron behavior is closely mimicked. While the above description constitutes the preferred embodiments of the present invention, it will be appreciated that the invention is susceptible to modifications, variation, and change without departing from the proper scope and fair meaning of the accompanying claims.

What is claimed is:

1. A system for emulating a neural network, said neural network to be emulated having architecture, operation mode and input data which are defined by a set of instructions, said system comprising:

a host computer for receiving, storing and transmitting said set of instructions defining the neural network and the neural network's input data;

a neural engine coupled to said host computer for processing said instructions and for performing neural network computations;

said neural engine including a control circuit comprising a microprocessor slice means for receiving, storing and transmitting said set of instructions received from said host computer defining the architecture and operation mode of said neural network;

each of said instructions having three fields, including opcode, source register and destination register fields, said instructions including register load and store instructions for initializing and storage of data in the microprocessor slice means;

said set of instructions also including neural network instructions for causing the neural engine to process the neural network specified in the microprocessor slice means;

a plurality of multiply and accumulate modules coupled to said control circuit for performing multiply and accumulate functions of said neural network; and said multiply and accumulate modules each including a plurality of weight storage means for storing a set of interconnection weights and the multiply and accumulate modules also including a plurality of multiplier and accumulate devices for generating the product of said input data times said interconnection weights and summing up all products for each neuron in said neural network, each multiplier and accumulate device being coupled to one of said weight storage means, wherein said multiplier and accumulate devices simultaneously perform multiply and accumulate operations during a single clock cycle of said system.

2. The system of claim 1 wherein said control circuit includes a configuration storage means for storing said instructions received from said host computer.

3. The system of claim 2 wherein said configuration storage means further receives, stores and transmits to said neural engine a sigmoid look-up table for defining the neural network's neuron transfer functions.

4. The system of claim 1 wherein said emulated neural network has predefined connection weight values and said multiply and accumulate modules include weight storage means for receiving and storing connection weight values from said host computer.

5. The system of claim 4 further comprising offset values stored in said weight storage means.

6. A method for emulating a neural network comprising the steps of:

performing neural network computations in a neural engine;

receiving from a host computer, storing and transmitting a set of instructions defining the operation of said neural network in a configuration storage means coupled to said neural engine;

storing a set of neural network parameters in a microprocessor slice means; and arranging each of said instructions such that they have three fields, including opcode, source register and destination register fields, said instructions including register load and storage instructions for initializing and storage of said network parameters in said microprocessor slice, and said set of instructions also including neural network instructions for causing the neural engine to process the neural network specified in the configuration storage means, and said set of instructions also including miscellaneous instructions for causing the neural engine to discontinue processing, interrupt said host computer, and jump instructions to next instruction to process.

7. A system for emulating and reconfiguring a neural network, said neural network to be emulated having architecture, operation mode and input data which are defined by a set of instructions, said system comprising:

a host computer for receiving, storing and transmitting said set of instructions defining the neural network and the neural network's input data;

a neural engine coupled to said host computer for processing said instructions and for performing neural network computations;

said neural engine including a control circuit comprising a microprocessor slice means for receiving, storing and transmitting said set of instructions received from said host computer defining the architecture and operation mode of said neural network;

each of said instructions having three fields, including opcode, source register and destination register fields, said instructions including register load and store instructions for initializing and storage of data in the microprocessor slice means;

said set of instructions also including neural network instructions for causing the neural engine to process the neural network specified in the microprocessor slice means, wherein said system can be reconfigured to emulate multiple neural network architectures by changing said instructions;

a plurality of multiply and accumulate modules coupled to said control circuit for performing multiply and accumulate functions of said neural network; and said multiply and accumulate modules each including a plurality of weight storage means for storing a set of interconnection weights and a plurality of multiplier and accumulate devices for generating the product of said input data times said interconnection weights and summing up all products for each neuron in said neural network, each multiply and accumulate device being coupled to one of said weight storage means, wherein said multiply and accumulate devices simultaneously perform multiply and accumulate operations during a single clock cycle of said system.

* * * * *